(12) United States Patent
Wong et al.

(10) Patent No.: US 9,655,110 B2
(45) Date of Patent: May 16, 2017

(54) ENHANCED PHYSICAL DOWNLINK CONTROL CHANNEL USER EQUIPMENT SPECIFIC SEARCH SPACE SUBBAND HOPPING FOR MACHINE TYPE COMMUNICATION DEVICE

(71) Applicants: Alcatel-Lucent USA Inc., Murray Hill, NJ (US); Alcatel Lucent, Boulogne-Billancourt (FR)

(72) Inventors: Shin Horng Wong, Chippenham (GB); Matthew Baker, Canterbury (GB); Sigen Ye, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 36 days.

(21) Appl. No.: 14/587,149

(22) Filed: Dec. 31, 2014

(65) Prior Publication Data
US 2016/0135176 A1    May 12, 2016

Related U.S. Application Data

(60) Provisional application No. 62/077,147, filed on Nov. 7, 2014.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0053* (2013.01); *H04W 4/005* (2013.01); *H04W 24/08* (2013.01)

(58) Field of Classification Search
CPC .. H04W 72/0446; H04W 4/005; H04W 24/08
(Continued)

(56) References Cited

U.S. PATENT DOCUMENTS

| 2013/0194956 | A1* | 8/2013 | Sartori | H04W 24/02 370/252 |
| 2013/0315159 | A1* | 11/2013 | Xia | H04W 72/042 370/329 |
| 2016/0112997 | A1* | 4/2016 | Chen | H04W 72/042 370/329 |

FOREIGN PATENT DOCUMENTS

| WO | 2014000174 A1 | 1/2014 | |
| WO | WO 2014000174 A1 * | 1/2014 | ........... H04L 5/0053 |

OTHER PUBLICATIONS

PCT/IB2015/002251 Notification of Transmittal of the International Search Report and the Written Opinion of the International Searching Authority, or the Declaration dated Feb. 17, 2016.
(Continued)

*Primary Examiner* — Charles C Jiang
*Assistant Examiner* — Wali Butt
(74) *Attorney, Agent, or Firm* — Davidson Sheehan LLP

(57) ABSTRACT

A method is provided for receiving, at a receiving device, a control information message from a transmitting device. The method includes monitoring a first plurality of reception resources contained in a first frequency range in a first subframe and a second plurality of reception resources contained in a second frequency range in a second subframe. The method also includes receiving a control information message in at least one of the monitored reception resources. The first frequency range is at least partly non-overlapping with the second frequency range.

16 Claims, 4 Drawing Sheets

(51) Int. Cl.
*H04W 4/00* (2009.01)
*H04W 24/08* (2009.01)

(58) Field of Classification Search
USPC ....... 370/241, 252, 280, 312, 329, 336, 350;
455/45, 63.1, 509
See application file for complete search history.

(56) References Cited

OTHER PUBLICATIONS

NTT Docomo: "Design of EPDCCH Search Space for low cost MTC"; 3GPP TSG RAN WG1 Meeting #78bis; R1-144147; 3GPP Mobile Competence Centre; 650 Route des Lucioles; F-06921 Sophia-Antipolis Cedex, France; vol. RAN WG1, Ljubljana, Slovenia, Oct. 6-10, 2014; pp. 1-4.

"3rd Generation Partnership Project; Technical Specification Group Radio Access Network; Evolved Universal Terrestrial Radio Access (E-UTRA); Physical Layer Procedures" (Release 12); 3GPP Standard; 3GPP TS 36.213, 3GPP Mobile Competence Centre; 650, Route des Lucioles; F-06921 Sophia-Antipolis Cedex, France; vol. RAN WG1, No. v12.3.0, Sep. 26, 2014; pp. 1-212.

\* cited by examiner

ENHANCED PHYSICAL DOWNLINK CONTROL CHANNEL USER EQUIPMENT SPECIFIC SEARCH SPACE SUBBAND HOPPING FOR MACHINE TYPE COMMUNICATION DEVICE

CROSS REFERENCE TO RELATED APPLICATIONS

This application claims priority to U.S. Provisional Patent Application 62/077,147 filed on Nov. 7, 2014, which is incorporated by reference herein in its entirety.

BACKGROUND

This application relates generally to communication systems, and, more particularly, to wireless communication systems.

Control signaling is necessary to support downlink and uplink transport channels. In Long Term Evolution (LTE) systems, Downlink Shared Channel (DL-SCH) and Uplink Shared Channel (UL-SCH) control signaling is utilized to support transport channels. The control signaling enables User Equipment (UE) to successfully receive, demodulate, and decode the DL-SCH. Downlink Control Information (DCI) is transmitted through a Physical Downlink Control Channel (PDCCH) and an Enhanced Physical Downlink Control Channel (EPDCCH). DCI includes information about the DL-SCH resource allocation (the set of physical resource blocks (PRBs) containing the DL-SCH), transport format and information related to the DL-SCH Hybrid Automatic Repeat reQuest (ARQ). A PRB includes a number of subcarriers by a number of symbols. In LTE, a PRB is twelve (12) subcarriers by seven (7) OFDM symbols, which is eighty-four (84) modulation symbols.

The DCI undergoes channel coding, the addition of a CRC attachment followed by convolutional coding and rate matching according to PDCCH format capacity, in order to form the PDCCH payload. The coded DCI bits (i.e., PDCCH payload) are then mapped to Control Channel Elements (CCEs) according to the PDCCH format. These coded bits are then converted to complex modulated symbols after performing operations including scrambling, Quadrature Phase Shift Keying (QPSK) modulation, layer mapping and precoding. Finally, the modulated symbols are mapped to physical Resource Elements (REs).

After performing deprecoding, symbol combining, symbol demodulation and descrambling at the receiver, the UE is required to perform blind decoding of the PDCCH payload as it is not aware of the detailed control channel structure, including the number of control channels and the number of CCEs to which each control channel is mapped. Multiple PDCCHs can be transmitted in a single subframe. All of these multiple PDCCHs may and may not be all relevant to a particular UE. The UE finds the PDCCH specific to it by monitoring a set of PDCCH candidates (e.g., a set of consecutive CCEs on which a PDCCH could be mapped) in every subframe. The UE uses its Radio Network Temporary Identifier (RNTI) to try and decode candidates. The RNTI is used to demask a PDCCH candidate's CRC. If no CRC error is detected, the UE determines that PDCCH carries control information for the UE.

A Machine Type Communication (MTC) device is a User Equipment (UE) that is used by a machine for specific application. For example, a MTC device could be associated with a water meter, electricity meter, or the like, and utilized to report usage measured by the meter. For instance, a MTC device could be a part of a health monitor and used to report a parameter or status of the health monitor. In LTE Rel-12, a Work Item (WI) on Low Complexity MTC (LC-MTC) UE was concluded where the complexity (cost) of the MTC UE was reduced by approximately fifty percent (50%). In LTE Rel-13, another WI was agreed to further reduce the complexity of MTC UE, to enhance the coverage and improve the power consumption of MTC UE. One of the complexity reduction techniques is to reduce the Radio Frequency (RF) bandwidth of the LC-MTC UE to 1.4 MHz (operating with 6 PRB). Herein, the term LC-MTC UE to refer to MTC UE operating in 1.4 MHz bandwidth.

A LC-MTC UE is expected to operate in any system bandwidth and shall be able to co-exist with legacy UEs. It is also expected that LC-MTC UE can retune its frequency to operate in different (1.4 MHz) sub-bands within the (larger) system bandwidth to allow frequency multiplexing among LC-MTC UE and also with legacy UE.

SUMMARY

Method, system and apparatus are provided herein for a User Equipment Specific Search Space (USS) for LC-MTC UE with limited RF bandwidth, including EPDCCH operation under limited RF bandwidth.

According to the methodology described and provided herein, one embodiment defines is a search space for reception of control messages which comprise different subbands in different subframes. Although the prior art supports hopping of the candidates within a search space from one subframe to another, the subband(s) within which this prior art hopping takes place are static across subframes; for the prior art search space generated in this manner, the candidates of the search space are generated from the same set of PRBs in each subframe while resources used for the candidate within the PRB can vary every subframe. This means the PRBs utilized are static from subframe to subframe.

According to one or more embodiments provided herein, advantageously the bandwidth the UE has the ability to receive in a given subframe is limited, but the total bandwidth across which the control messages can be distributed can be up to the full system bandwidth. It should be noted and appreciated that by spreading the USS across multiple subframes, the USS can be spread across a larger bandwidth thereby benefiting from frequency diversity (which is available in prior art legacy systems). Thus, according to one or more embodiments of the invention, the PRBs forming the USS are distributed over different subbands across the bandwidth in different subframes, where in each subframe the PRBs are contained within a subband.

One example embodiment is a method for receiving, at a receiving device, a control information message from a transmitting device. The method includes monitoring a first plurality of reception resources contained in a first frequency range in a first subframe and a second plurality of reception resources contained in a second frequency range in a second subframe, and receiving a control information message in at least one of the monitored reception resources. The first frequency range is at least partly non-overlapping with the second frequency range.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

DETAILED DESCRIPTION

Figure 1:
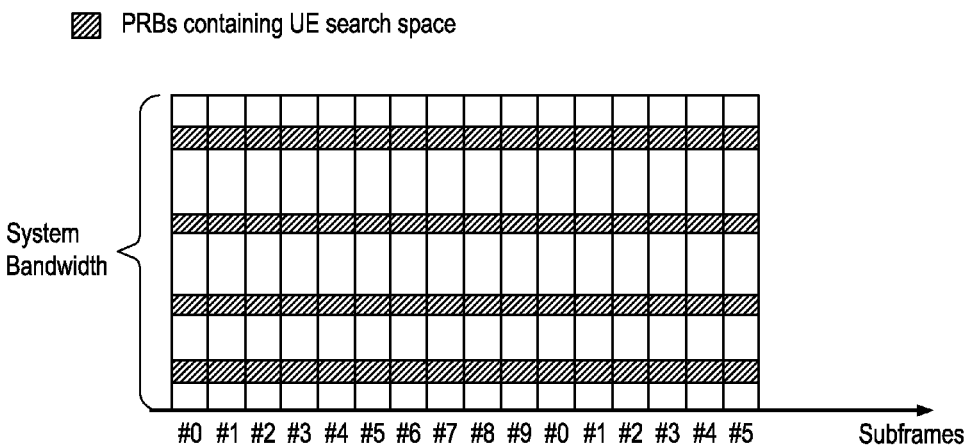
FIG. 1 illustrates PRBs used in the existing EPDCCH USS of prior art legacy systems, where the PRBs forming the USS may be spread over the entire system bandwidth within a single subframe.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

FIG. 1 shows an example of the PRBs used in the existing EPDCCH USS of prior art legacy systems, where the PRBs forming the USS can be spread over the entire system bandwidth within a single subframe. For example, as illustrated in FIG. 1, four (4) different PRBs spread across the system bandwidth in each subframe are utilized to form candidates of the USS. (PRBs containing the USS shaded in FIG. 1) Other numbers of PBRs in each subframe may be utilized to form candidates for the USS. Formation of the USS in this manner is of course feasible for a non-MTC UE, since such a non-MTC UE can receive all PRBs in the entire system bandwidth. These PRBs used to generate a candidate for the EPDCCH USS are the same across different subframes (until an RRC reconfiguration is made to change the PRB resources).

Since the existing Physical Downlink Control Channel (PDCCH) spans the entire system bandwidth, it cannot be used directly for LC-MTC UE for system bandwidth greater than 1.4 MHz. For UE specific scheduling, it is expected that Enhanced PDCCH (EPDCCH) will be used for LC-MTC UE. In the existing system, EPDCCH can be transmitted in a localized or distributed manner. Localized transmission relies on Channel State Information (CSI) feedback from the UE so that the enhanced NodeB (eNB) can schedule the EPDCCH on Physical Resource Blocks (PRBs) (i.e., frequency resource) with the best RF condition. Distributed transmission is used when CSI feedback is not available or unreliable and the EPDCCH is distributed over a large bandwidth to benefit from frequency diversity. These transmission options are feasible in existing systems since the PRB resources used for the EPDCCH USS (UE Specific Search Space, which consists of a number (typically thirty-two (32)) of candidates in which a control channel message (e.g., downlink control information (DCI)) may be sent to the UE) can be distributed over the entire system bandwidth and CSI feedback can be provided on subbands across the system bandwidth. However, methodology of transmission is no longer possible for LC-MTC UE that can only operate in one subband at a time.

In addition, although the prior art supports hopping of the candidates within a search space from one subframe to another, the subband(s) within which this hopping takes place are static across subframes; for the prior art search space generated in this manner, the candidates of the search space are generated from the same set of PRBs in each subframe while resources used for the candidate within the PRB can vary every subframe. This means the PRBs utilized are static from subframe to subframe.

Figure 2:
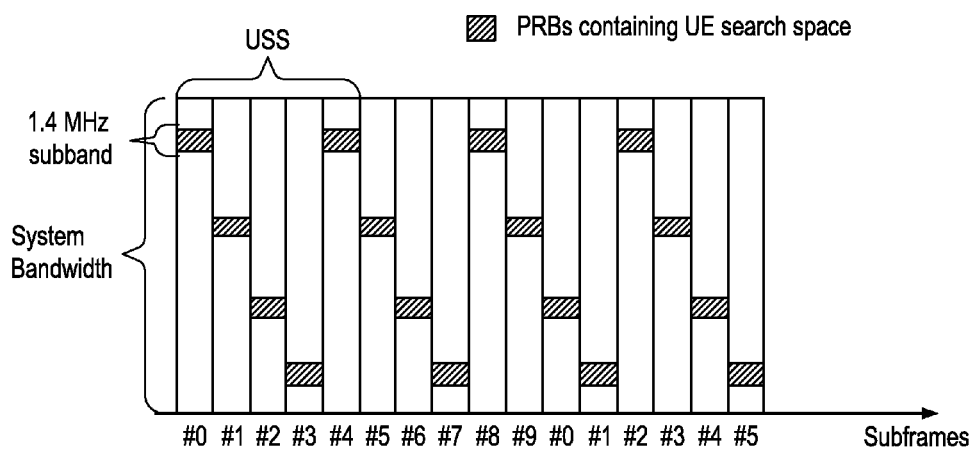
FIG. 2 illustrates an example embodiment according to the principles of the invention, in which the PRBs of the USS are spread across (for example) four (4) subframes, where in each subframe the PRBs of the search space are contained within a (for example) six (6) PRB subband.

FIG. 2 shows one embodiment of the invention, in which the PRBs of the USS are spread across (for example) four (4) subframes, where in each subframe the PRBs of the search space are contained within a (for example) six (6) PRB subband. The PRBs forming the USS may be spread across various other numbers of subframes and may be contained within various other numbers of PRB-width subbands. Various numbers of PRBs may be used to generate the candidates of the USS. For example, the possible number of PBR include two (2), four (4) or eight.

In order to receive a control information message from a transmitting device, a receiving device forms and decodes candidates of a USS. As illustrated by the USS in FIG. 2, this will involve monitoring at least a first plurality of reception resources contained in a first frequency range in a first subframe and a second plurality of reception resources contained in a second frequency range in a second subframe. A control information message may then be received in the monitored reception resources or at least one of the monitored reception resources as further explained below. The reception resources in the second subframe may start at a time later than the end of the reception resources in the first subframe. In one embodiment, the second subframe may start at the end of the first subframe.

As illustrated in FIG. 2, the first frequency range is at least partly non-overlapping with the second frequency range. In particular, as illustrated in FIG. 2, the first frequency range does not overlap with the second frequency range.

The PRB and subframe allocation of the USS can, for example, be configured via RRC signaling, or predefined in the LTE specifications. In one such embodiment, a search space according to the invention is created by dividing a conventional search space into subbands and shifting each subband by a different subframe offset. However, this approach may result in some candidates within the search space being split across multiple subframes (e.g., in the current system disclosed herein, an EPDCCH candidate can occupy several PRBs, e.g., in the case of so-called "distributed" EPDCCH candidates); in this case the UE would need to wait until the multiple subframes required to generate the candidate for the USS were received (and would need to buffer and/or store the relevant PRBs across the multiple subframes) before it could decode a DCI message transmitted in one such candidate. Accordingly, the control information message may be partly received in a reception resource in the first subframe and partly received in a reception resource in the second subframe.

In one such embodiment, a search space according to the invention is created by dividing a conventional search space into subbands and shifting to a particular subband according to a subframe offset.

Therefore, in one alternative embodiment, the subbands and candidates for the USS are designed such that each candidate is self contained within a single subband, and hence within a single subframe. By making the candidates contained within a subband in each subframe, the UE can decode the DCI message within a subframe. According to one implementation of this embodiment, different EPDCCH sets are transmitted in different subframes, where the PRBs in each EPDCCH set are contained with a subband. Thus, a UE according to this implementation, would check for different EPDCCH sets in different subframes. In contrast, in prior art legacy systems, while two (2) EPDCCH sets can be configured, and if two EPDCCH sets are configured, the UE monitors both sets in every subframe.

One limitation of the above embodiments is that the number of candidates per subframe is reduced compared to the legacy system in which all candidates are available in every subframe. In an alternative embodiment, therefore, the candidates of the search space in each subframe are calculated using the same formula as for the legacy search space, but with the system bandwidth replaced with the subband bandwidth—i.e., as if the system bandwidth was reduced to be equal to the subband bandwidth (e.g., six (6) PRBs). One embodiment can thus be seen as a wideband frequency hopping imposed on top of a conventional (narrowband) search space.

In any of the above embodiments, the invention may be further adapted by arranging the PRBs of the USS in a given subband to perform frequency hopping within the subband. In the current system the possible number of PRBs in the USS is two (2), four (4) or eight (8). According to this adaptation of any of the previous embodiments, if the number of PRBs in the USS is less than that of the subband (e.g., if the number of PRBs in USS is less than six (6) PRBs) then the frequency location of these PRBs can change within the subband in different subframes. Such a frequency hopping sequence can be signaled during Radio resource Control (RRC) configuration, or predefined, and/or may be a function of a UE Identifier (ID) (e.g., Radio Network Temporary Idenfier (RNTI), International Mobile Subscriber Identity (IMSI), International Mobile Station Equipment Identity (IMEI), Mobile Equipment Identifier (MEID), Electronic Serial Number (ESN), Mobile Subscriber Integrated Services for Digital Network Number (MSISDN). Thus, an indication of the frequency range of at least one of the group consisting of the first plurality of reception resources and the second plurality of reception resources may be received in a signaling message from a transmitting device in order for the receiving device to function as described. Further, the frequency range of any the reception resources may be predetermined or may be dependent on an identity of the receiving device.

The UE may need certain switching time to tune from one subband to another subband when the subband for EPDCCH monitoring changes between subframes.

In one embodiment, the UE uses the duration of the legacy downlink control region for subband re-tuning, if the re-tuning can be done sufficiently fast. Note that currently EPDCCH transmission starts after the legacy downlink control region, which spans one (1) to three (3) Orthogonal Frequency Division Multiplexed (OFDM) symbols (when the system bandwidth is larger than 1.4 MHz).

In another embodiment, there is one subframe (or more) unused for EPDCCH monitoring before changing the subband for EPDCCH monitoring. This provides the UE sufficient time to switch the subband. For example, the UE may have USS defined only in every other subframe. For example, there may exist at least a third subframe between the end of the first subframe and the start of the second subframe that are used to form the USS. For another example, for every five (5) subframes, the UE can have USS defined in a number of consecutive subframes (e.g., four (4) subframes) using the same band, followed by one (1) subframe unused for EPDCCH monitoring. The subframes that are not used by the UE for EPDCCH monitoring can be either configured using higher-layer signaling or predefined.

In another embodiment, a portion of a subframe (e.g., a number of OFDM symbols or half a subframe) is reserved for UE subband re-tuning. This time duration only needs to be reserved when the subband for EPDCCH monitoring changes, and the length of the duration can be either predefined or configured using higher-layer signaling. Note that the resource reservation is from the UE point of view. From the eNB point of view, the eNB does not need to reserve the resources for any subbands other than the one that the UE monitors. Moreover, the eNB does not need to reserve the resources within the subband that the UE monitors if the eNB does not intend to send any EPDCCH to this UE in the subframe.

Figure 3:
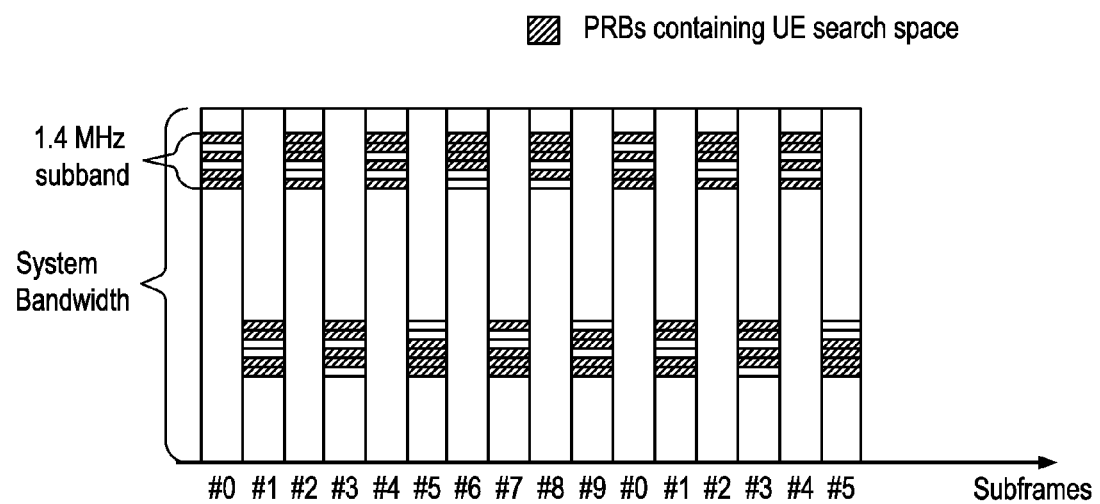
FIG. 3 shows the PRB and subband allocation for one example configuration which allows the EPDCCH to be spread across a frequency space.

FIG. 3 shows the PRB and subband allocation for one example configuration which allows the EPDCCH to be spread across a frequency space. According to the illustration in FIG. 3, the USS is configured as follows:

- The USS is formed from four (4) PRBs. As illustrated, four (4) PRBs are highlighted in a subband.
- The USS occupies two (2) different (1.4 MHz) subbands such that the search space in all even subframes would be contained in one subband and the search space in all odd subframes would be contained in the other subband. For example, a first plurality of reception resources containing USS may occur in each of a first sequence of periodically occurring subframes and a second plurality of reception resources containing USS may occur in each of a second sequence of periodically occurring subframes, the second sequence of periodically occurring subframes being interleaved between the subframes of the first sequence of periodically occurring subframes. For example, the frequency location of at least one of the first plurality of reception resources within the first frequency range may be different between the first subframe and at least one other subframe of the first sequence of periodically occurring subframes.
- The candidates within each subband are preferably complete, i.e., the UE can decode a DCI message carried by the EPDCCH within a single subframe. As illustrated, in subframe #0, the USS is generated from a first subband (e.g., the upper subband of the figure); in subframe #1, the USS is generated from a second subband (e.g, the lower subband of the figure); in subframe #2, the USS is generated from the first subband X; and so on, etc.
- Thirty-two (32) candidates are provided within each subframe.
- Optionally, the PRB locations of the USS within each subband (which is six (6) PRBs) may change according to a pattern. In this example, the pattern is repeated every radio frame, i.e., there are ten (10) different PRB patterns. As illustrated, the PRBs containing the USS are the same in both subframe #0, subframe #0 being the start of a radio frame.

Figure 4:
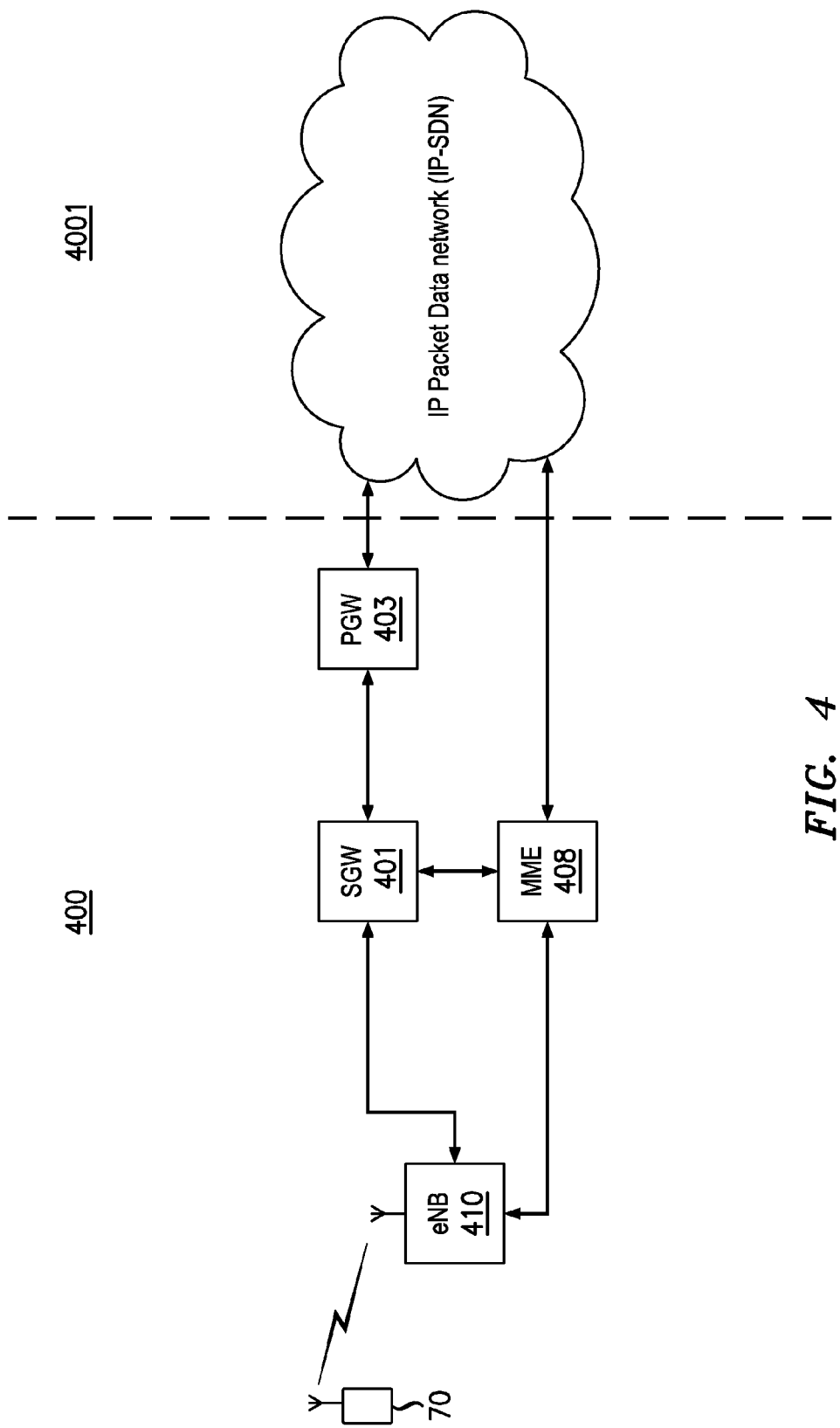
FIG. 4 illustrates a portion of an Evolved Packet System (EPS) in which embodiments of the invention may be deployed.

FIG. 4 illustrates a portion of an Evolved Packet System (EPS). The EPS includes an Internet Protocol (IP) Connectivity Access Network (IP-CAN) 400 and an IP Packet Data Network (IP-PDN) 4001. Referring to FIG. 4, the IP-CAN 400 includes: a serving gateway (SGW) 401; a packet data network (PDN) gateway (PGW) 403; a mobility management entity (MME) 408, and an eNB 405. Although not shown, the IP-PDN 4001 portion of the EPS may include application or proxy servers, media servers, email servers, etc.

Within the IP-CAN 400, the eNB 405 is part of what is referred to as an Evolved Universal Mobile Telecommunications System (UMTS) Terrestrial Radio Access Network (EUTRAN), and the portion of the IP-CAN 400 including the SGW 401, the PGW 403, and the MME 408 is referred to as an Evolved Packet Core (EPC). Although only a single eNB 405 is shown in FIG. 4, it should be understood that the EUTRAN may include any number of eNBs. Similarly, although only a single SGW, PGW and MME are shown in FIG. 4, it should be understood that the EPC may include any number of these core network elements.

The eNB 405 provides wireless resources and radio coverage for UEs including UE 410 which utilizes a USS, as described herein. UE may be a MTC device. For the purpose of clarity, only one UE is illustrated in FIG. 4. However, any number of UEs may be connected (or attached) to the eNB 405. The eNB 405 is operatively coupled to the SGW 401 and the MME 408.

The SGW 401 routes and forwards user data packets, while also acting as the mobility anchor for the user plane during inter-eNB handovers of UEs. The SGW 401 also acts as the anchor for mobility between 3$^{rd}$ Generation Partnership Project Long-Term Evolution (3GPP LTE) and other 3GPP technologies. For idle UEs, the SGW 401 terminates the downlink data path and triggers paging when downlink data arrives for UEs.

The PGW 403 provides connectivity between the UE 410 and the external packet data networks (e.g., the IP-PDN 4001) by being the point of entry/exit of traffic for the UE 410. As is known, a given UE may have simultaneous connectivity with more than one PGW for accessing multiple PDNs.

The PGW 403 also performs policy enforcement, packet filtering for UEs, charging support, lawful interception and packet screening, each of which are well-known functions. The PGW 403 also acts as the anchor for mobility between 3GPP and non-3GPP technologies, such as Worldwide Interoperability for Microwave Access (WiMAX) and 3$^{rd}$ Generation Partnership Project 2 (3GPP2 (code division multiple access (CDMA) 1× and Enhanced Voice Data Optimized (EvDO)).

Still referring to FIG. 4, the eNB 405 is also operatively coupled to the MME 408. The MME 408 is the control-node for the EUTRAN, and is responsible for idle mode UE paging and tagging procedures including retransmissions. Idle mode may be a mode where the UE has not been used in a threshold amount of time of, for example, 10 minutes, 30 minutes or more. The MME 408 is also responsible for choosing a particular SGW for a UE during initial attachment of the UE to the network, and during intra-LTE handover involving Core Network (CN) node relocation.

The MME 408 authenticates UEs by interacting with a Home Subscriber Server (HSS), which is not shown in FIG. 4.

Non Access Stratum (NAS) signaling terminates at the MME 408, and is responsible for generation and allocation of temporary identities for UEs. The MME 408 also checks the authorization of a UE to camp on a service provider's Public Land Mobile Network (PLMN), and enforces UE roaming restrictions. The MME 408 is the termination point in the network for ciphering/integrity protection for NAS signaling, and handles security key management.

The MME 408 also provides control plane functionality for mobility between LTE and 2G/3G access networks with the S3 interface from the SGSN (not shown) terminating at the MME 408. The MME 408 also terminates the S6a interface to the home HSS for roaming UEs.

Figure 5:
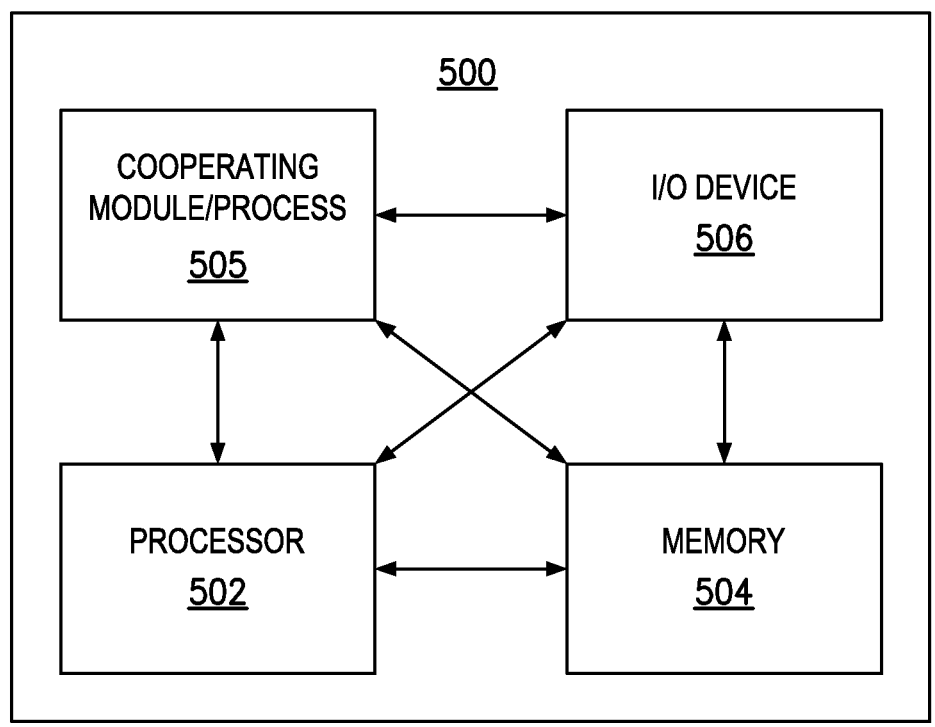
FIG. 5 depicts a high-level block diagram of a computer suitable for use in performing the operations and methodology described herein.

FIG. 5 depicts a high-level block diagram of a computer suitable for use in performing the operations and methodology described herein. The computer 500 includes a processor 502 (e.g., a central processing unit (CPU) or other suitable processor(s)) and a memory 504 (e.g., random access memory (RAM), read only memory (ROM), and the like).

The computer 500 also may include a cooperating module/process 505. The cooperating process 505 can be loaded into memory 504 and executed by the processor 502 to implement functions as discussed herein and, thus, cooperating process 505 (including associated data structures) can be stored on a computer readable storage medium, e.g., RAM memory, magnetic or optical drive or diskette, and the like.

The computer 500 also may include one or more input/output devices 506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 500 depicted in FIG. 5 provides a general architecture and functionality suitable for implementing functional elements described herein or portions of functional elements described herein. For example, the computer 500 provides a general architecture and functionality suitable for implementing one or more of a UE, an eNB, SGW, MME, PGW, network element, and the like. For example, a processor of a UE can be configured to provide functional elements that implement in the UE functions as discussed herein.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of one or more of the methods described herein. The program storage devices may be non-transitory media, e.g., digital memories, magnetic storage media such as a magnetic disks or tapes, hard drives, or optically readable digital data storage media. In one or more embodiments, tangible medium excluding signals may include a set of instructions which when executed are operable to perform one or more of the descried methods. The provided embodiments are also intended to be embodied in computers programmed to perform said steps of methods described herein.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms 'a' or 'an', as used herein, are defined as one or more than one. The term "plurality", as used herein, is defined as two or more than two. The term "another", as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all functionality associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the Packet Data Network Gateways (PGW), Serving Gateways (SGW), Mobility Management Entities (MME), UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

Reference will now be made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description.

Aspects of various embodiments are specified in the claims. Those and other aspects of various embodiments are specified in the following numbered paragraphs:

1. A method for receiving, at a receiving device, a control information message from a transmitting device, the method comprising:

monitoring a first plurality of reception resources contained in a first frequency range in a first subframe and a second plurality of reception resources contained in a second frequency range in a second subframe, and receiving a control information message in at least one of the monitored reception resources;

wherein the first frequency range is at least partly non-overlapping with the second frequency range.

2. A method as claimed in claim 1, wherein the first frequency range does not overlap with the second frequency range.

3. A method as claimed in any of claims 1 to 2, wherein the control information message is received in a reception resource in only one subframe.

4. A method as claimed in any of claims 1 to 2, wherein the control information message is partly received in a reception resource in the first subframe and partly received in a reception resource in the second subframe.

5. A method as claimed in any of claims 1 to 4, further comprising:

receiving an indication of the frequency range of at least one of the group consisting of the first plurality of reception resources and the second plurality of reception resources in a signaling message from the transmitting device.

6. A method as claimed in any of claims 1 to 4, wherein the frequency range of at least one of the group consisting of the first plurality of reception resources and the second plurality of reception resources is predetermined.

7. A method as claimed in any of claims 1 to 4, wherein at least one of the first frequency range and the second frequency range is dependent on an identity of the receiving device.

8. A method as claimed in any of claims 1 to 7, wherein the reception resources in the second subframe start at a time later than the end of the reception resources in the first subframe.

9. A method as claimed in claim 8, wherein the second subframe starts at the end of the first subframe.

10. A method as claimed in claim 8, wherein at least a third subframe exists between the end of the first subframe and the start of the second subframe.

11. A method as claimed in any of claims 1 to 10, wherein the first plurality of reception resources occurs in each of a first sequence of periodically occurring subframes and the second plurality of reception resources occurs in each of a second sequence of periodically occurring subframes, the second sequence of periodically occurring subframes being interleaved between the subframes of the first sequence of periodically occurring subframes.

12. A method as claimed in claim 11, wherein the frequency location of at least one of the first plurality of reception resources within the first frequency range is different between the first subframe and at least one other subframe of the first sequence of periodically occurring subframes.

13. A method as claimed in claim 12, wherein the difference between the frequency location of the at least one of the first plurality of reception resources in the first subframe and the frequency location of the at least one of the first plurality of reception resources in the second subframe is dependent on an identity of the receiving device.

14. A device for receiving a control information message from a transmitting device, the device comprising:

a monitoring apparatus adapted to monitor a first plurality of reception resources contained in a first frequency range in a first subframe and a second plurality of reception resources contained in a second frequency range in a second subframe; and a receiving apparatus adapted to receive a control information message in at least one of the monitored reception resources;

wherein the first frequency range is at least partly non-overlapping with the second frequency range.

15. A device for transmitting a control information message to a receiving device, the device comprising:

transmission apparatus adapted to transmit a plurality of control information messages, wherein at least a first one of the control information messages is transmitted in a first frequency range in a first subframe and at least a second one of the control information messages is transmitted in a second frequency range in a second subframe, wherein the first frequency range is at least partly non-overlapping with the second frequency range.

16. A device as claimed in claim 15, further comprising:

a signaling apparatus adapted to transmit to the receiving device an indication of at least one of the first frequency range and the second frequency range.

17. A device comprising a processor and an associated memory, the processor configured to generate candidates of a user equipment specific search space (USS) for reception of a control message, at least one candidate generated from a plurality of physical resource blocks (PRBs), at least two of the plurality of PRBs from different subframes.

18. The device of claim 17 wherein the PRBs of the different subframes are from different subbands.

19. A device of claim 18 wherein the different subbands are at least partly non-overlapping in frequency.

20. The device of claim 17 wherein the processor is configured to generate the at least one candidate from the plurality of PRBs, wherein the plurality PRBs include at least a first PRB of a first subframe and a second PBR of a second subframe.

21. The device of any of claims 17-20 wherein the PRBs for each subframe of the two or more subframes are within a respective subband.

22. The device of claim 21 wherein the respective subband varies from subframe to subframe.

23. The device of any of claims 17-22 wherein the processor is configured to
generate the candidates of the USS from a set of PRBs spread across four subframes, wherein in respective ones of the four subframes, the PRBs of the USS are contained within a six PBR subband.

24. The device of any of claims 17-22 wherein the processor is configured to receive radio resource control signaling of a physical resource block & subframe allocation of the USS.

25. The device of any of claims 17-22 wherein the processor is configured to utilize a physical resource block & subframe allocation for the USS that is predefined in the memory.

26. The device of any of claims 17-22 wherein the processor is configured to utilize a physical resource block & subframe allocation for the USS as a function of at least one or a group consisting of a UE Identifier (ID), a Radio Network Temporary Identifier (RNTI), an International Mobile Subscriber Identity (IMSI), International Mobile Station Equipment Identity (IMEI), a Mobile Equipment Identifier (MEID), an Electronic Serial Number (ESN), and a Mobile Subscriber Integrated Services for Digital Network Number (MSISDN).

27. The device of any of claims 17-26 wherein the processor is configured to
store the PRBs relevant to the at least one candidate from a first subframe of the two or more subframes to a second subframe of the two or more subframes.

28. The device of any of claims 17-26 wherein the processor is configured to
buffer the PRBs relevant to the at least one candidate across ones of the two or more subframes.

29. The device of any of claims 17-28 wherein the processor is configured to
decode a downlink control message (DCI) message transmitted in the at least one candidate.

30. The device of any of claims 17-29 wherein the device is a Machine Type Communication User Equipment (MTC UE) or a Low Complexity (LC) MTC UE.

31. A device comprising a processor and an associated memory, the processor configured to
generate candidates of a user equipment specific search space (USS) for reception of a control message from the physical resource blocks (PRBs) of a subband, wherein a set of PRBs utilized to generate at least one the candidates varies from a first subframe to a second subframe.

32. The device of claim 31 wherein the subband from which the PRBs are obtained to generate the candidates of the USS varies from the first subframe to the second subframe.

33. The device of claim 31 wherein the processor is configured to generate the candidates of the USS only in every other subframe.

34. The device of claim 31 wherein the processor is configured to generate the candidates of the USS for a first number of consecutive subframes using a same subband, followed by a second number of subframe unused for EPDCCH monitoring.

The invention claimed is:

1. A method for receiving, at a receiving device limited to operation within a subband of a frequency range of potential operation during a single subframe, the subband being smaller than the frequency range, the method for receiving a control information message from a transmitting device, the method comprising:
monitoring at the receiving device, a first plurality of reception resources contained in a first subband in a first subframe for a first portion of the control information message and a second plurality of reception resources contained in a second subband in a second subframe for a second portion of the control information message; and
receiving at the receiving device the control information message in the monitored reception resources, the control information message formed from the first portion and the second portion;
wherein the first subband is at least partly non-overlapping with the second subband.

2. The method as claimed in claim 1, wherein the first subband does not overlap with the second subband.

3. The method as claimed in claim 1, wherein the control information message is partly received in a reception resource in the first subframe and partly received in a reception resource in the second subframe.

4. The method as claimed in claim 1, further comprising:
receiving at the receiving device, an indication of the subband of at least one of the group consisting of the first plurality of reception resources and the second plurality of reception resources in a signaling message from the transmitting device.

5. The method as claimed in claim 1, wherein the subband of at least one of the group consisting of the first plurality of reception resources and the second plurality of reception resources is predetermined.

6. The method as claimed in claim 1, wherein at least one of the first subband and the second subband is dependent on an identity of the receiving device.

7. The method as claimed in claim 1, wherein the second plurality of reception resources in the second subframe start at a time later than the end of the first plurality of reception resources in the first subframe.

8. The method as claimed in claim 7, wherein the second subframe starts at the end of the first subframe.

9. The method as claimed in claim 7, wherein at least a third subframe exists between the end of the first subframe and the start of the second subframe.

10. The method as claimed in claim 1, wherein the first plurality of reception resources occurs in each of a first sequence of periodically occurring subframes and the second plurality of reception resources occurs in each of a second sequence of periodically occurring subframes, the second sequence of periodically occurring subframes being interleaved between the subframes of the first sequence of periodically occurring subframes.

11. The method as claimed in claim 10, wherein a frequency location of at least one of the first plurality of reception resources within the first subband is different between the first subframe and at least one other subframe of the first sequence of periodically occurring subframes.

12. The method as claimed in claim 11, wherein a difference between the frequency location of the at least one of the first plurality of reception resources in the first subframe and a frequency location of the at least one of the first plurality of reception resources in the second subframe is dependent on an identity of the receiving device.

13. A device for receiving a control information message from a transmitting device, the device for receiving limited to operation within a subband of a frequency range of potential operation during a single subframe, the subband being smaller than the frequency range, the device for receiving comprising:
 a monitoring apparatus adapted to monitor a first plurality of reception resources contained in a first subband in a first subframe for a first portion the control information message and a second plurality of reception resources contained in a second subband in a second subframe for a second portion the control information message; and
 a receiving apparatus adapted to receive the control information message in the monitored reception resources, the control information message formed from the first portion and the second portion;
 wherein the first frequency range is at least partly non-overlapping with the second frequency range.

14. An eNodeB for transmitting a control information message to a machine type communication device limited to operation within a subband of a frequency range of potential operation during a single subframe, the subband being smaller than the frequency range, the eNodeB comprising
 transmission apparatus adapted to transmit a plurality of control information message portions, wherein at least a first one of the plurality of control information message portions is transmitted in a first subband in a first subframe and at least a second one of the plurality of control information message portions is transmitted in a second subband in a second subframe, the control information message formed from the first one and the second one of the control information message portions,
 wherein the first subband is at least partly non-overlapping with the second subband.

15. The eNodeB as claimed in claim 14, further comprising:
 a signaling apparatus adapted to transmit to the machine type communication device an indication of at least one of the first subband and the second subband.

16. The device of claim 13 wherein the receiving apparatus is configured to receive radio resource control signaling of a physical resource block & subframe allocation of a user equipment specific search space (USS) for reception of the control information message, wherein the physical resource block & subframe allocation for the USS is one of the group consisting of predefined in the memory or a function of at least one of the group consisting of a UE Identifier (ID), a Radio Network Temporary Identifier (RNTI) an International Mobile Subscriber Identity (IMSI), International Mobile Station Equipment Identity (IMEI), a Mobile Equipment Identifier (MEID), an Electronic Serial Number (ESN), and a Mobile Subscriber Integrated Services for Digital Network Number (MSISDN).

* * * * *